Oct. 21, 1930.                H. R. McDONALD                1,779,181
                    ROTOR SIPHON FOR AERATING LIQUID, ETC
                    Filed July 8, 1929          2 Sheets-Sheet 1
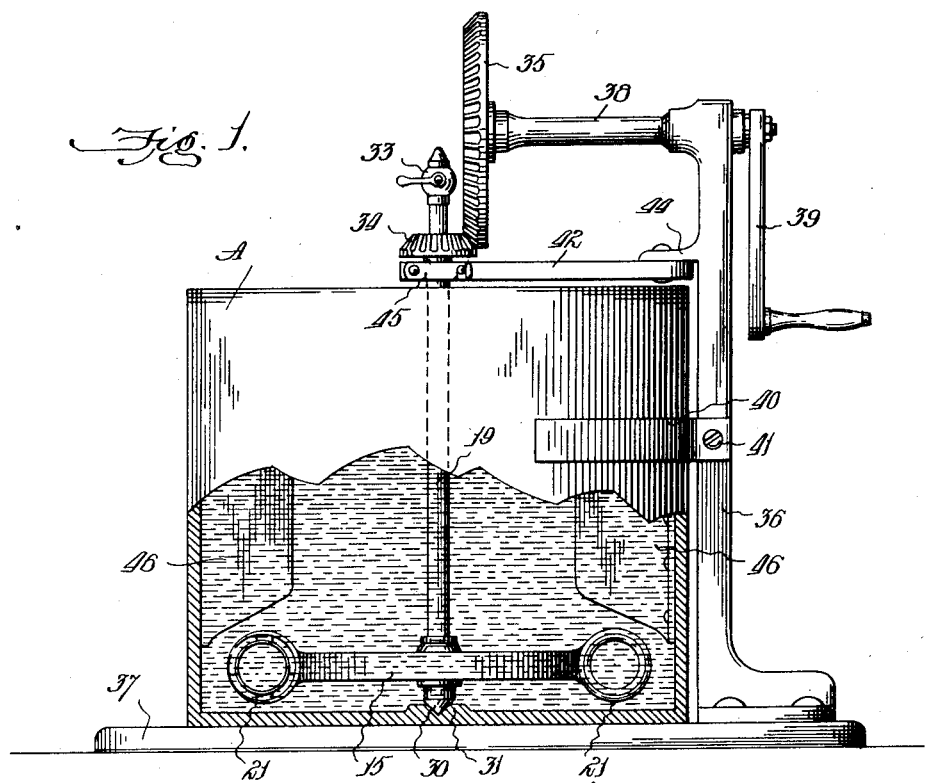
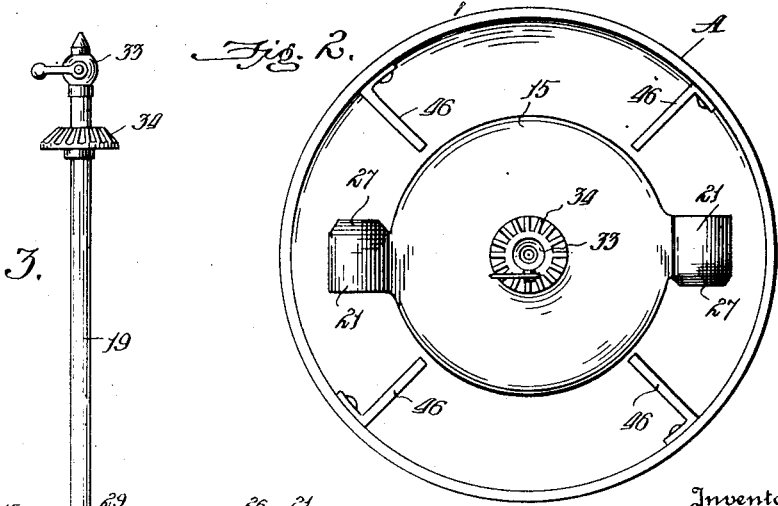
Inventor
Hugh R. McDonald,
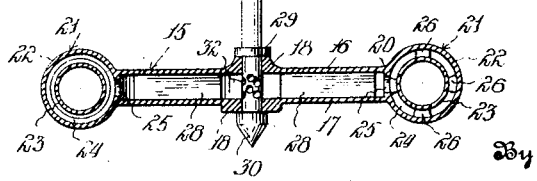
Attorney

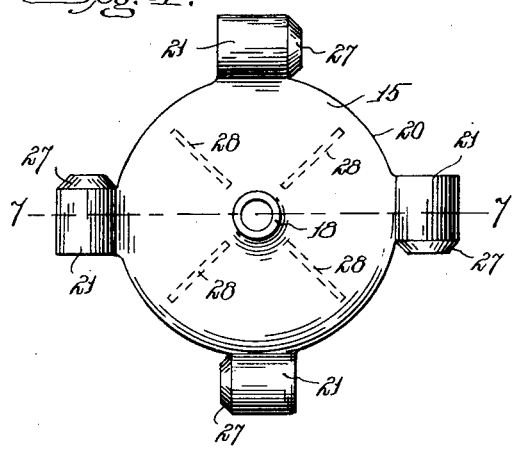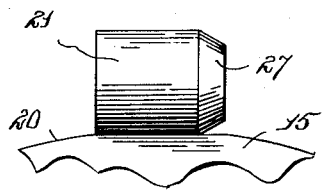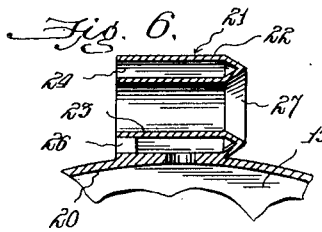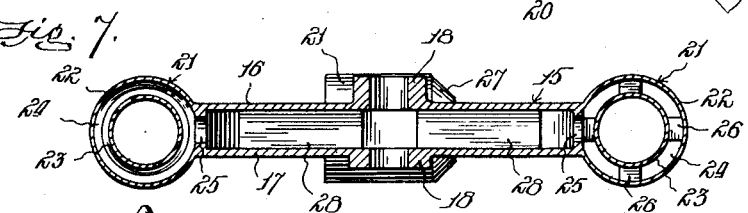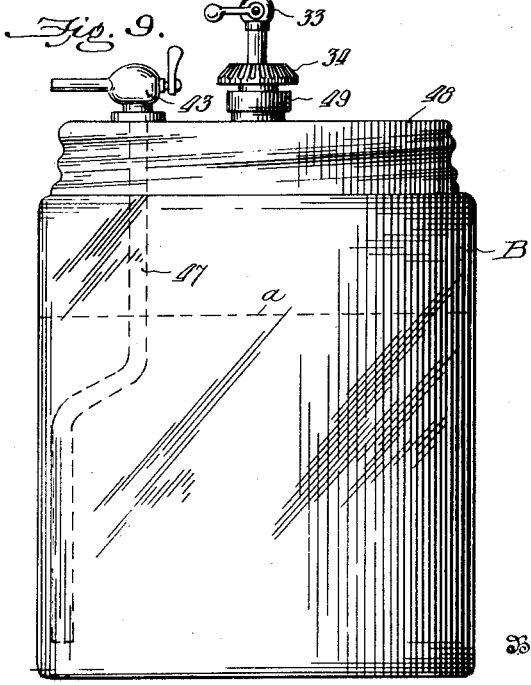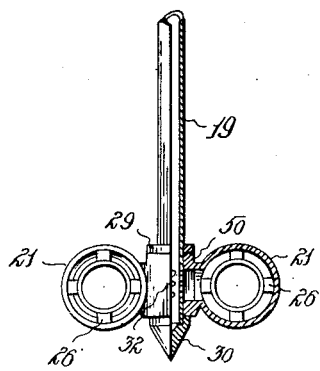

Patented Oct. 21, 1930

1,779,181

UNITED STATES PATENT OFFICE

HUGH ROBERT McDONALD, OF VIRGINIA, MINNESOTA

ROTOR SIPHON FOR AERATING LIQUID, ETC.

Application filed July 8, 1929. Serial No. 376,833.

My invention relates to apparatus employed in aerating liquids for the purpose of purification as well as to provide for siphoning liquid from the container in the form of a spray.

The primary object of my invention is to provide a rotor siphon having impeller loops in connection with a hollow wheel and tubular shaft which are submerged in the liquid and rapidly rotated, whereby air from the atmosphere is drawn through the tubular shaft and wheel for discharging it from the impeller loops into the body of liquid to thoroughly aerate the same, with baffle plates located in the container for the purpose of preventing a whirling motion of the liquid under the influence of the rotor siphon.

My invention contemplates the production of an apparatus of this nature which may be used effectively for aerating liquids and siphoning the same from a container after the manner of an ordnary siphon bottle, and consists in the particular construction and arrangement of parts including the air impeller loops, all as hereinafter fully described and particularly set forth in the appended claims.

In the drawings

Figure 1 is a side elevation, partly in section, showing the application of my invention to an open top tank and including means for manually operating the rotor siphon.

Fig. 2 is a plan view of the rotor siphon in connection with the tank.

Fig. 3 is a detail view of the rotor siphon, partly in section.

Fig. 4 is a plan view illustrating a modification with respect to the air impeller loops.

Fig. 5 is an enlarged detail side elevation of one of the air impeller loops.

Fig. 6 is a sectional view thereof.

Fig. 7 is an enlarged sectional view on the line 7—7 of Fig. 4.

Fig. 8 is a view showing a modification in the use of the impeller loops, and

Fig. 9 is an elevation illustrating a modification in the application of the rotor siphon.

Like numerals of reference indicate like parts in the several views of the drawings.

In carrying out my invention I employ a hollow wheel 15 comprising spaced apart disks 16 and 17 enlarged centrally, at 18, to reinforce the connection to the wheel of a tubular shaft 19 by means of which it is operated as hereinafter described, and attached to the periphery or rim 20 of said wheel, or formed integrally therewith, are a plurality of air impeller loops 21 spaced at equal distances around said periphery and so constructed as to draw the air from the wheel and discharge it into the body of liquid. For this purpose each air impeller loop preferably cylindrical in shape consists of short tubes 22 and 23 of different diameters placed one within the other and spaced apart for the major portion of their length and brought together at one end for closing the annular chamber 24 between said tubes with the other end of said chamber open for discharging air therefrom, the air entering said chamber through the periphery of the wheel by way of opening 25 and for bracing the spaced tubes opposite the closed end of the chamber spacing blocks 26 are employed. The closed end 27 of the annular chamber around the central opening in the air impeller loops is V-shape in cross section, and it will be noted by reference to the drawings that the liquid will pass through the center of the loop as well as over the sides thereof from the closed end of the annular chamber and by tending to form a vacuum between the spaced tubes 22 and 23 will create a suction at the open end of the chamber thus acting to draw the air from the hollow wheel into said annular chamber from which it will be discharged into the body of the liquid as the wheel and loops are rotated, the forcing of the air through the wheel from the tubular shaft connected to the center thereof being assisted by propeller blades 28 secured within said wheel between the disks and disposed radially after the manner of fan blades.

The tubular shaft 19 is secured at its lower end to the wheel 15 by means of a collar 29 and coupling 30, the latter being tapered to a point for pivoting the shaft in a bearing seat 31 in the bottom of the container A (Fig. 1), and that part of the tubular shaft which extends through the wheel between the collar and coupling is provided with perforations 32 for the passage of air from the atmosphere into the wheel by way of said shaft, it being understood that the wheel and air impeller loops carried thereby are placed in the body of liquid with the upper end of the tubular shaft exposed to the atmosphere and subjected to a rapid revolving motion to cause the air to be drawn into the shaft, wheel and impeller loops by suction so as to be discharged from the impeller loops into the body of liquid within the container, suitable means being provided for driving the shaft.

When the rotor siphon is to be used in connection with an open container (Fig. 1) the outer end of the shaft may be left open to the atmosphere, but when it is used in connection with a closed receptacle, as B Fig. 10, for both aerating the liquid and providing air pressure above the same for expelling the contents after the manner of an ordinary siphon bottle the tubular shaft is closed at its upper end by a valve 33, and for operating the rotor siphon it is provided near its upper end with a bevel-pinion 34 adapted to mesh with a bevel gearwheel 35 which may be driven in any suitable manner either by motor or manually, in the latter instance a simple and effective arrangement for holding the container and supporting the driving mechanism being illustrated in Fig. 1 wherein the standard 36 rises from a base 37 and is provided at its upper end with a hollow horizontal arm 38 in which the shaft carrying the aforementioned gearwheel is journalled and operated by a crank handle 39. For holding the tank or container in place curved clamping members 40 are secured by bolt 41 to the opposite sides of the standard, and for holding the upper end of the shaft for the proper intermeshing of the gearwheels an arm 42 extends outwardly from the standard to engage said shaft. In such instances where the device is used in connection with a closed container having a valved siphon nozzle 43 (Fig. 10) it is desirable that the container be easily removed or detached from the operating mechanism and for this purpose arm 42 is pivoted to a projection 44 on the standard so that the outer end thereof may be swung into and out of engagement with the tubular shaft 19, the notch in the arm which receives said shaft being closed by a latch 45. As will be obvious this operating mechanism provides a convenient arrangement for manually operating the rotor siphon in either an open or closed container, as it will permit of the container being removed after the liquid has been aerated so as to receive another container, the rotor siphon being usable in connection with a number of open containers but remains in the container when the latter is used after the manner of a siphon bottle or for spraying other liquids than beverages, such as paint, liquid insecticides, etc. In each instance, however, the container is provided with baffle plates 46 extending from the sides thereof to prevent a whirling motion of the body of liquid under the influence of the rotation of the wheel and air impeller loops, the baffle plates being located above the travel of the air impeller loops and terminating at their inner ends so as to not interfere with the removal of the wheel and air impeller loops carried thereby. It will be noted also that when a closed container is used to provide for forcing liquid out of the container by air pressure through a valved nozzle as shown in Fig. 10 the tube 47 extending downwardly into the body of liquid from the nozzle terminates near the bottom of the container at one side thereof or out of the way of the travel of the rotor siphon, and of course in this instance the level a of the body of liquid is some distance below the sealing top or cap 48 to leave sufficient space for the required air pressure, and the tubular shaft passes through a stuffing box 49 to provide a tight joint and prevent the air escaping when the valve 33 is closed.

The construction, operation, and application of my improved rotor siphon to various uses, will be readily understood from the foregoing description in connection with the accompanying drawings for it will not only provide for aerating impure or stagnant water which may be stored in containers of various kinds but will also provide for using the container in siphoning out the contents in the form of a spray or stream as desired. Furthermore, the aerating device or hollow wheel carrying the impeller loops when used in connection with a closed container as shown in Fig. 9 may be first submerged in the liquid to aerate the same and then rapidly rotated in the air space above the liquid to compress the air for forcing the liquid from the container, in this instance the beveled pinion being splined to the tubular shaft, as will be understood, to maintain the gearing with the large beveled wheel. It will be apparent also that the device may be used for various other purposes than herein particularly mentioned, for instance it may be employed in the household for stirring eggs, mixing salad dressings, aerating liquids for better fermentation, etc., providing a device of this kind which is simple in construction, easily operated, and of comparatively few parts constructed and combined in a manner to insure strength and durability.

Although I have shown and described the preferred embodiment of my invention consisting essentially of a hollow wheel with air impeller loops around the periphery and a tubular shaft connected to the wheel for operating the same and to provide an air passage to the to the atmosphere it will be understood that modifications or changes may be made within the spirit and scope of the appended claims; as for instance the impeller loops 21 may be applied directly to the tubular shaft 19 for using the device to establish a low air pressure or for mixing icings, etc. in an open receptacle, it being understood that when so applied the hollow wheel is dispensed with and the impeller loops either welded directly to the tube with suitable openings through said tube leading thereto or a hub 50 provided as shown in Fig. 8, being held in place by a collar 29 and conical end bearing 30, as in the case of the hollow wheel.

I claim:

1. A device for aerating liquids, etc., comprising a rotary tubular shaft, and air impeller loops carried by the tubular shaft and consisting of short tubes of different diameters located one within the other in spaced relation to provide an annular chamber closed at one end, said annular chambers in the air impeller loops communicating with the air passage through the tubular shaft.

2. A device for aerating liquids, etc., comprising a hollow wheel, a tubular shaft connected to said wheel for operating the same and for providing a passage from the atmosphere to the air chamber in said wheel, and air impeller loops secured to the rim of the wheel and consisting of short tubes of different diameters located one within the other in spaced relation to provide an annular chamber closed at one end, said annular chambers in the air impeller loops communicating with the air chamber in the wheel through openings in the rim of said wheel.

3. A device for aerating liquids, etc., comprising a hollow wheel, a tubular shaft connected to the center of said wheel for rotating the same and to provide an air passage, air impeller loops secured to the wheel and communicating with the chamber therein, and blades in the chamber of the hollow wheel for inducing air currents therein.

4. A device for aerating liquids, etc., comprising a hollow wheel, a tubular shaft connected to the center of the wheel for rotating the same and to provide an air passage, air impeller loops secured to the rim of the wheel to project outwardly therefrom and consisting of short tubes of different diameters located one within the other in spaced relation to provide an annular chamber closed at one end, said annular chambers in the air impeller loops communicating with the air chamber in the wheel through openings in the rim, and blades in the chamber of the hollow wheel for inducing air currents therein to augment the action of the air impeller loops.

5. A device for aerating liquids, etc., comprising a hollow wheel, a tubular shaft connected to the center of the wheel for rotating the same and to provide an air passage, and air impeller loops secured to the rim of the wheel consisting of short tubes of different diameters located one within the other in spaced relation with the ends of said tubes brought together to form an annular chamber closed at one end and open at the other end, said annular chamber communicating with the air chamber in the wheel through the rim of the latter.

6. A device for aerating liquids, etc., comprising a hollow wheel, a tubular shaft connected to the center of the wheel for rotating the same and to provide an air passage, and air impeller loops secured to the rim of the wheel consisting of short tubes of different diameters located one within the other in spaced relation with the ends of said tubes brought together in V-shape form to cross section providing an annular chamber closed at one end and open at the other end, said annular chamber communicating with the air chamber in the wheel through the rim of the latter.

7. A device for aerating liquids, etc., comprising a hollow wheel, a tubular shaft passing through the center of said wheel beyond the lower side thereof, a coupling on the lower end of the tubular shaft to form a pivot bearing, said tubular shaft having perforations communicating with the air chamber in the wheel, and air impeller loops secured to the rim of the wheel and having annular air chambers closed at one end and communicating with the chamber in the wheel.

8. A device for aerating liquids, etc., comprising a hollow wheel, a tubular shaft passing through the center of said wheel beyond the lower side thereof, a coupling on the projecting end of the tubular shaft forming a pivot bearing, said tubular shaft having perforations communicating with the air chamber in the wheel, impeller loops secured to the rim of the wheel and communicating with the air chamber therein, a valve at the outer end of the tubular shaft, and a gear wheel secured to the shaft to provide for operating the same.

9. In combination with a siphon container, of a liquid aerating and air compressing device therefor comprising a hollow wheel, a tubular shaft connected to the center of said wheel and communicating with the air chamber therein, a gear wheel secured to the upper end of the tubular shaft, and air impeller loops secured to the rim of the wheel and communicating with the aforesaid air chamber; together with a standard having arcuate clamping members receiving the container and a horizontal bearing at its upper end, a driving shaft journaled in said bearing and having a crank handle at its outer end, a gear wheel fixed to the inner end of the driving shaft to mesh with the gear wheel on the tubular shaft, and a swinging arm pivoted to the standard to engage the upper end of said tubular shaft for bracing the same.

HUGH ROBERT McDONALD.